(12) United States Patent
Wang et al.

(10) Patent No.: US 11,315,519 B2
(45) Date of Patent: Apr. 26, 2022

(54) CONTROL METHOD FOR IMPROVING NETWORK PERFORMANCE

(71) Applicant: AMLOGIC (SHANGHAI) CO., LTD., Shanghai (CN)

(72) Inventors: Jinping Wang, Shanghai (CN); Wei Wang, Shanghai (CN); Jing Liu, Shanghai (CN); Wei Yu, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 239 days.

(21) Appl. No.: 16/662,806

(22) Filed: Oct. 24, 2019

(65) Prior Publication Data

US 2020/0135138 A1 Apr. 30, 2020

(30) Foreign Application Priority Data

Oct. 31, 2018 (CN) .......................... 201811289342.4

(51) Int. Cl.
*G09G 5/00* (2006.01)
*H04N 21/4363* (2011.01)
(Continued)

(52) U.S. Cl.
CPC ....... *G09G 5/006* (2013.01); *H04N 21/43635* (2013.01); *H04N 21/4438* (2013.01);
(Continued)

(58) Field of Classification Search
CPC .............. G09G 5/006; G09G 2370/06; G09G 2370/12; G09G 2370/22; H04N 21/43635;
(Continued)

(56) References Cited

U.S. PATENT DOCUMENTS

| 2006/0095596 A1* | 5/2006 | Yung ................... H04L 12/2832 710/5 |
| 2007/0165997 A1* | 7/2007 | Suzuki ............. H04N 21/43615 386/234 |

(Continued)

*Primary Examiner* — Fernando Alcon
(74) *Attorney, Agent, or Firm* — Sinorica LLC

(57) ABSTRACT

The invention provides a control method for improving network performance, comprising: each upstream device issues corresponding playing commands and performs filtering to the playing commands to obtain first available playing commands; a downstream device switches to a route where the first available playing commands is located, and then issues vendor command parameters; an implementation module receives the vendor command parameters, then enables a timer, and sets identification information; during the preset timer time period, the implementation module filters the first available playing commands to obtain second available playing commands; when the preset timer time period ends, the implementation module turns off the timer and resets the identification information; and the downstream device receives the second available playing commands and switches to a route where the second available playing commands is located. The present invention has the following advantageous effects: the network congestion and the transmission delay are reduced.

9 Claims, 5 Drawing Sheets

(51) Int. Cl.
*H04N 21/443* (2011.01)
*H04N 21/472* (2011.01)

(52) U.S. Cl.
CPC ... *H04N 21/47202* (2013.01); *G09G 2370/06* (2013.01); *G09G 2370/12* (2013.01); *G09G 2370/22* (2013.01)

(58) Field of Classification Search
CPC .......... H04N 21/4438; H04N 21/47202; H04L 12/2816; H04L 2012/2849; H04L 12/2838; H04L 45/02; H04L 45/74; H04L 47/32; H04L 67/125
See application file for complete search history.

(56) References Cited

U.S. PATENT DOCUMENTS

| | | | | |
|---|---|---|---|---|
| 2008/0247544 | A1* | 10/2008 | Candelore | H04N 21/43632 380/241 |
| 2008/0320539 | A1* | 12/2008 | Ohkita | H04N 21/43615 725/118 |
| 2013/0076989 | A1* | 3/2013 | Barnett | H04N 21/42227 348/734 |
| 2016/0227272 | A1* | 8/2016 | Hatambeiki | H04N 21/2541 |
| 2017/0288895 | A1* | 10/2017 | Marino | G09G 5/006 |
| 2019/0191017 | A1* | 6/2019 | Aggarwal | G08C 17/02 |

* cited by examiner

CONTROL METHOD FOR IMPROVING NETWORK PERFORMANCE

CROSS-REFERENCE TO RELATED APPLICATIONS

The present application claims priority to and the benefit of Chinese Patent Application No. CN 201811289342.4 filed on Oct. 31, 2018, the entire content of which is incorporated herein by reference.

BACKGROUND OF THE INVENTION

1. Field of the Invention

The invention relates to the field of communication technologies, and more particularly, to a control method for improving network performance.

2. Description of the Related Art

Recent years have witnessed the rapid development of consumer electronics products with High Definition Multimedia Interface (HDMI), and Consumer Electronics Control (CEC) has become a trend in the market. For CEC, communication of messages is achieved by using a bus. A plurality of devices are suspended from the bus by means of wires and logics, so that a CEC network is formed. CEC devices are generally classified into three categories: upstream devices (source devices), midstream devices (switch devices), and downstream devices (sink devices). For users, One Touch Play (OTP) means that playing an upstream device may be achieved with one touch, and it allows the upstream device to become an active source device.

The upstream device functions as the source of OTP. An OTP message is sent by the upstream device and is then selected by a route of the midstream device; finally, the selected OTP message is transmitted to the downstream device, thereby triggering switching of corresponding routes and playing of audios and videos. It should be noted the OTP message is generated for some reasons, and it may be triggered by satisfying the following conditions:

1. changes in levels detected by Hot Plug Detection (HPD) may trigger the upstream device to sent the OTP message;
2. scanning messages periodically (such as request power status command in the CEC network command: <Give Power Status>) can sometimes trigger the upstream device to send the OTP messages;
3. one touch may trigger the upstream device to send the OTP messages;
4. buffering of messages in the midstream device may trigger the upstream device to send the OTP messages.

Other triggering conditions may be contemplated and will not be described in detail herein.

In addition, in a CEC network, only one active source device is available at a time. When an upstream device becomes the active source, it may definitely initialize the downstream device to broadcast corresponding commands. Many kinds of CEC devices are available in the market. All kinds of the CEC devices do not comply with high standards as expected, and mechanisms for triggering the OTP message are also different. Therefore, when different types of devices exist in the CEC network, upstream devices on different paths may be triggered simultaneously to implement OTP. As a result, the entire network has to perform multiple selections of routes and switchover of routes of the upstream devices, which leads to the phenomenon of obvious "jitter" and "thrash" for a long period of time. Route switchovers will undoubtedly result in a sharp increase in the number of messages in the CEC network, and network congestion and transmission delay may occur, and the user experience is extremely lowered.

In order to improve the CEC network performance, the existing technical solution aims to extend CEC functions and to enable CEC to be compatible with much more application scenarios. Arranging the CEC commands according to priority and filtering the CEC commands may only filter out continuous exception messages or messages related to damaged devices, and it may alleviate the CEC network congestion and delay to a certain extent. Self-defining vendor command parameters and allocating multiple logic addresses to the same device only serve to extend the CEC functions and interface compatibility. However, such measures neither solve the problems of the network congestion at the peak of CEC network transmission, nor solve the problem of OTP compatibility with a plurality of upstream devices.

SUMMARY OF THE INVENTION

Given that the foregoing problems exist in the prior art, the present invention provides a control method for improving network performance, which is intended to reduce network congestion and transmission delay.

The detailed technical solution is as follows:

A control method for improving network performance, applied to a network of High Definition Multimedia Interface-Consumer Electronics Control (HDMI-CEC), wherein the network of the HDMI-CEC accesses at least one upstream device and a downstream device, and each of the upstream devices is communicatively connected with each of the downstream device through an implementation module;

wherein the control method comprises the steps of:

Step S1, each of the upstream devices issues corresponding playing commands; performs filtering to the playing commands to obtain first available playing commands;

Step S2, the downstream device receives the first available playing commands, switches to a route where the downstream device corresponding to the first available playing commands is located, and then issues vendor command parameters;

Step S3, the implementation module receives the vendor command parameters, then enables a timer with a preset timer time period, and sets identification information corresponding to the timer;

Step S4, during the preset timer time period, the implementation module filteres the first available playing commands of each of the upstream devices to obtain second available playing commands;

Step S5, when the preset timer time period ends, the implementation module turns off the timer and resets the identification information; the downstream device receives the second available playing commands and switches to a route where the downstream device corresponding to the second available playing commands is located; and controls the corresponding upstream device to operate based on the second available playing commands.

Preferably, in the control method for improving network performance, Step S1 comprises the steps of:

Step S11, selecting a respective route by each of the upstream devices;

Step S12, issuing corresponding playing commands by each of the upstream devices;

Step S13, creating a message queue by the implementation module, and the playing commands corresponding to the upstream devices being sequentially stored in the message queue at a preset interval;

Step S14, filtering the playing commands, by the implementation module, according to a preset condition, so as to obtain the first available playing commands.

Preferably, in the control method for improving network performance, in Step S13, the preset interval is in a range from 0.01 s to 0.1 s.

Preferably, in the control method for improving network performance, in Step S14, the preset condition is that a plurality of identical and continuous playing commands are recorded as one of the first available playing commands.

Preferably, in the control method for improving network performance, in Step S2, the vendor command parameters refer to identification information of the route where the downstream device corresponding to the first available playing commands is located.

Preferably, in the control method for improving network performance, in Step S3, the preset timer time period is in a range from 3 s to 7 s.

Preferably, in the control method for improving network performance, Step S3 comprises the steps of:

Step S31, the implementation module receives the vendor command parameters and creates a regulating unit;

Step S32, the regulating unit enables a timer with a preset timer time period;

Step S33, the regulating unit sets identification information corresponding to the timer, and saves device information of the downstream device corresponding to the vendor command parameters.

Preferably, in the control method for improving network performance, Step S4 comprises the steps of:

Step S41, during the preset timer time period, obtaining, by the implementation module, route information and device information of the upstream device corresponding to the first available playing commands in the message queue;

Step S42, determining whether the route corresponding to the route information is exactly the route where the downstream device is located;

if yes, turning to Step S43;

if no, turning to Step S44;

Step S43, comparing, by the implementation module, the device information in the message queue with each of the device information in the regulating unit, to determine whether the device information in the message queue is the same as any one of the device information in the regulating unit;

if yes, the implementation module removes the upstream device from the message queue, and exits;

if no, the implementation module saves the upstream device in the message queue, and records the first available playing commands corresponding to the upstream device in the message queue as the second available playing commands; and Step S44, removing, by the implementation module, the upstream device corresponding to the route from the message queue.

Preferably, in the control method for improving network performance, in prior to Step S5, the control method further comprises: determining whether the first available playing commands are periodic commands during the preset timer time period;

if yes, the implementation module suppresses and delays the sending of the playing commands by the upstream device;

if no, continue to perform Step S4.

The above-mentioned technical solution has the following advantages or advantageous effects: by performing multiple filterings to the playing commands corresponding to each of the upstream devices, the compatibility among a plurality of upstream devices is improved, and the network congestion and the transmission delay are reduced.

BRIEF DESCRIPTION OF THE DRAWINGS

The accompanying drawings, together with the specification, illustrate exemplary embodiments of the present disclosure, and, together with the description, serve to explain the principles of the present invention.

Figure 1:
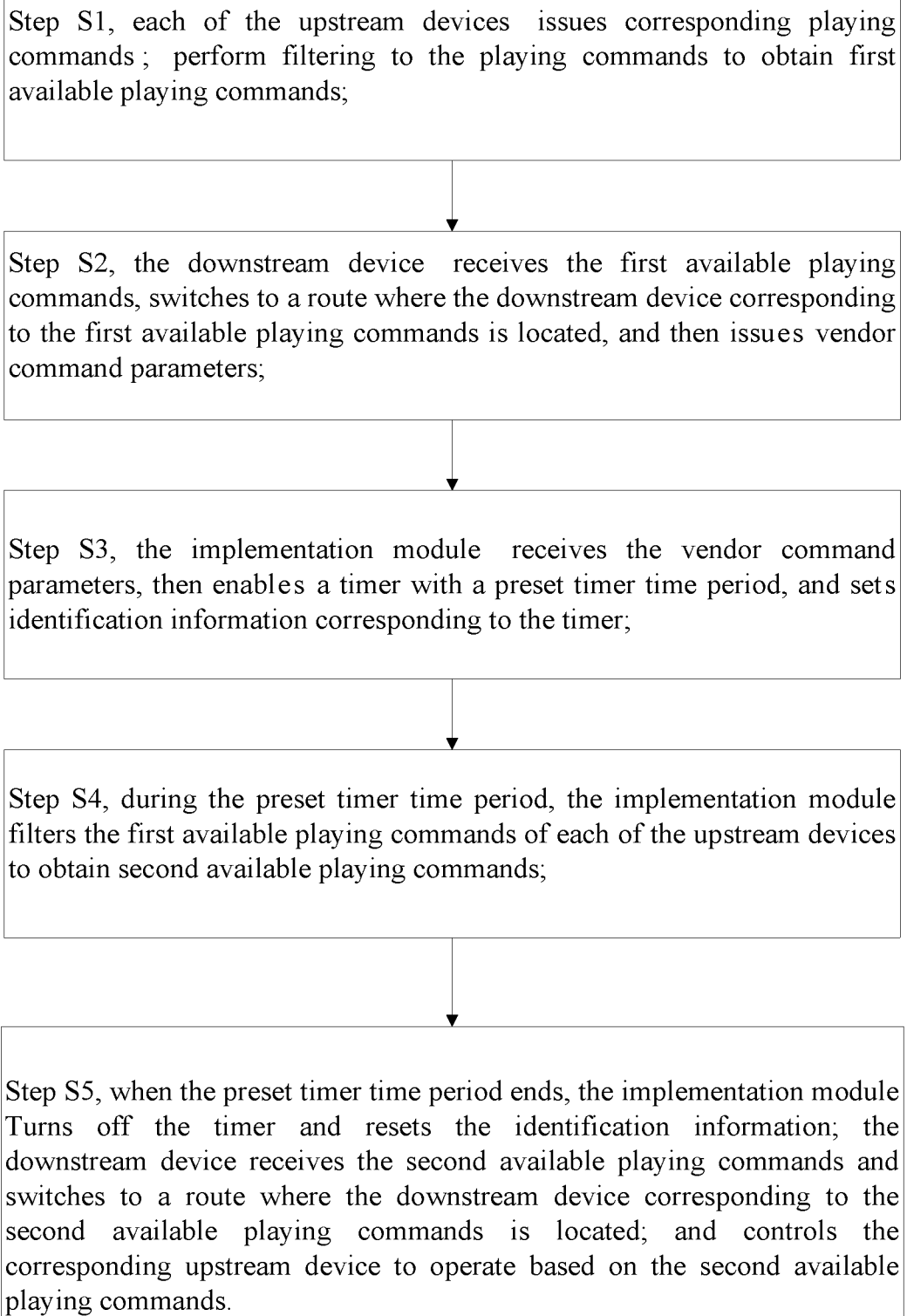
FIG. 1 is a flowchart showing a control method for improving network performance according to an embodiment of the present invention.

Reference numerals in the drawings: 1. Downstream device, 2. Implementation module, 3. Upstream device, 4. Upstream device.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The present invention comprises a control method for improving network performance, applied to a network of High Definition Multimedia Interface-Consumer Electronics Control (HDMI-CEC), wherein the network of the HDMI-CEC accesses at least one upstream device and a downstream device 1, and each of the upstream devices is communicatively connected with each of the downstream device 1 through an implementation module 2;

as shown in FIG. 1, the control method comprises the steps of:

Step S1, each of the upstream devices issues corresponding playing commands; perform filtering to the playing commands to obtain first available playing commands;

Step S2, the downstream device 1 receives the first available playing commands, switches to a route where the downstream device 1 corresponding to the first available playing commands is located, and then issues vendor command parameters;

Step S3, the implementation module 2 receives the vendor command parameters, then enables a timer with a preset timer time period, and sets identification information corresponding to the timer;

Step S4, during the preset timer time period, the implementation module 2 filters the first available playing commands of each of the upstream devices to obtain second available playing commands;

Step S5, when the preset timer time period ends, the implementation module 2 turns off the timer and resets the identification information; the downstream device receives the second available playing commands and switches to a route where the downstream device 1 corresponding to the second available playing commands is located; and controls the corresponding upstream device to operate based on the second available playing commands.

In the above-mentioned embodiment, by performing multiple filterings to the playing commands corresponding to each of the upstream devices, the compatibility among a plurality of upstream devices is improved, and network congestion and transmission delay are reduced.

Furthermore, in a preferred embodiment, a CEC network may have a maximum of 15 devices accessed, for example, at least one upstream device (referred to as a source device) and one downstream device 1 (referred to as a sink device), sometimes, together with a midstream device 3 (referred to as a switch device), for example, at least one midstream device 3 in the case of cascaded CEC network.

Figure 5:
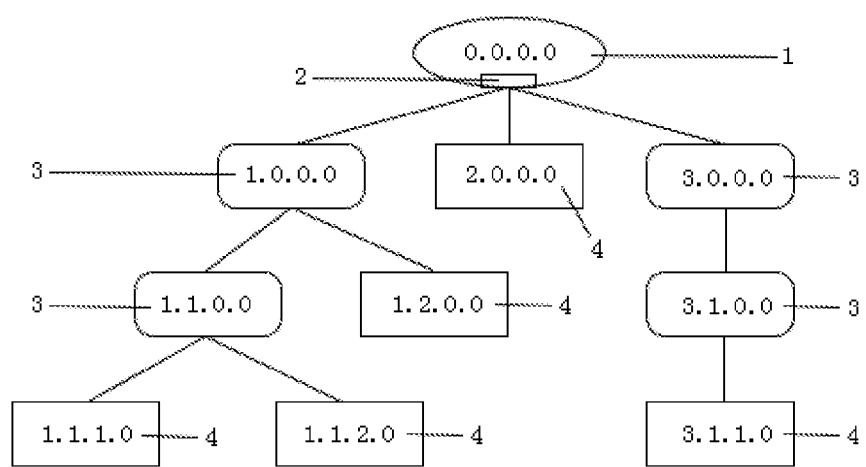
FIG. 5 is a schematic diagram showing the device connection of a four-layer CEC network of a control method for improving network performance according to an embodiment of the present invention.

As shown in FIG. 5, 10 devices are connected to the four-layer CEC network. The 10 devices comprise a downstream device 1, 5 upstream devices, and a plurality of midstream devices could be arranged between the downstream device 1 and the upstream device. Each device has its own physical address. In this embodiment, the physical address is defined by a rule described below. Specifically, the physical address of a device (in the embodiment it is downstream device 1) set as a location of the root is 0.0.0.0, the physical address of a device set as a sub-location of the root is 1.0.0.0, 2.0.0.0, etc., the physical address of a device set as a sub-location of the 2.0.0.0 is 2.1.0.0, 2.2.0.0, etc. The ten devices comprises five upstream devices 4 having the physical addresses of 1.1.1.0, 1.1.2.0, 1.2.0.0, 2.0.0.0 and 3.1.1.0, respectively, four midstream devices 3 having the physical addresses of 1.0.0.0, 1.1.0.0, 3.0.0.0, and 3.1.0.0, respectively, and one downstream device 1 having the physical address of 1.0.0.0. Wherein, in this embodiment, the implementation module 2 is positioned above a Hardware Abstraction Layer (HAL) of the downstream device, or may be positioned in the midstream device 3.

Figure 2:
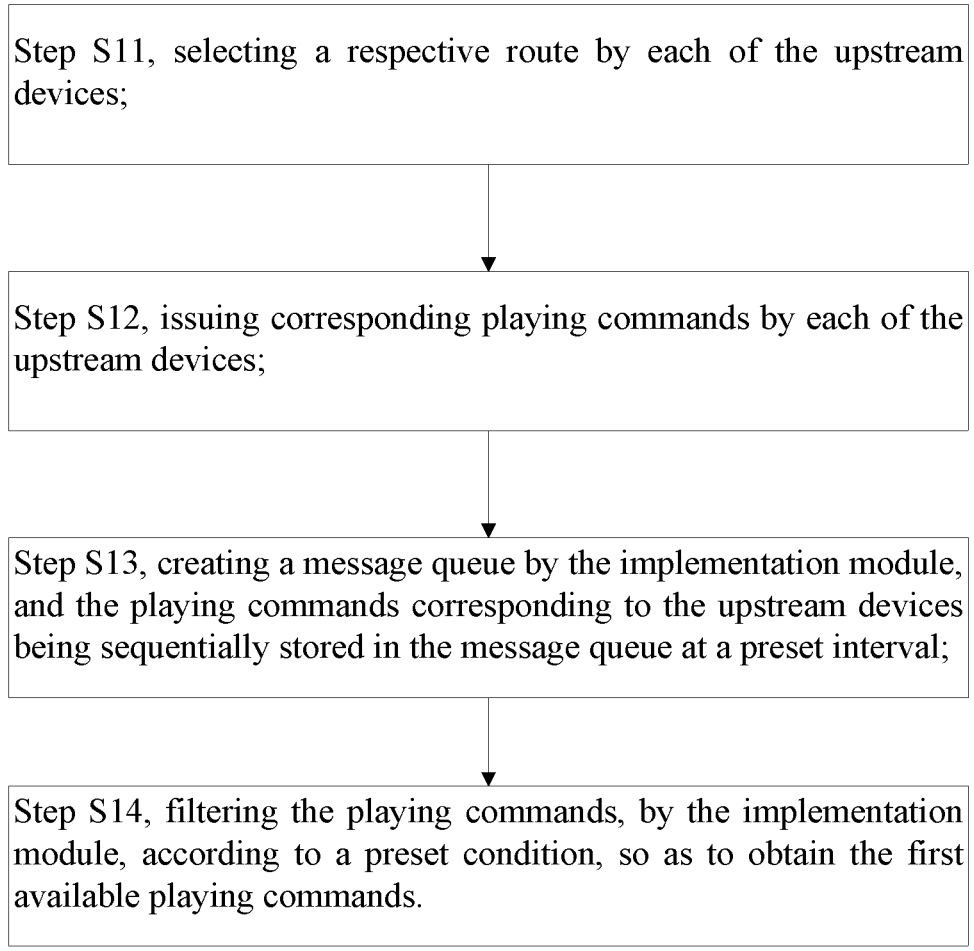
FIG. 2 is a flowchart showing Step S1 of a control method for improving network performance according to an embodiment of the present invention.

Furthermore, in the above-mentioned embodiment, as shown in FIG. 2, Step S1 comprises the steps of:

Step S11, selecting a respective route by each of the upstream devices;

Step S12, issuing corresponding playing commands by each of the upstream devices;

Step S13, creating a message queue by the implementation module 2, and the playing commands corresponding to the upstream devices being sequentially stored in the message queue at a preset interval;

Step S14, filtering the playing commands, by the implementation module 2, according to a preset condition, so as to obtain the first available playing commands.

It should be noted that the playing commands are OPT information.

In this embodiment, by setting the message queue, the playing commands corresponding to each of the upstream devices may be stored sequentially therein, and then the storage of the playing commands is in order. Afterwards, the downstream device 1 is allowed to receive the playing commands one after another, that is, the buffering function is achieved. Thus, the network congestion and the transmission delay are reduced.

Furthermore, in a preferred embodiment, in Step S13, the preset interval is in a range from 0.01 s to 0.1 s.

Furthermore, in the above-mentioned embodiment, in Step S14, the preset condition is that: a plurality of identical and continuous playing commands are recorded as one of the first available playing commands. The downstream device 1 is allowed to receive a more efficient playing command by filtering out continuous identical playing commands, so that the number of the playing commands is reduced; the network congestion and the transmission delay are reduced; and availability of the devices is increased.

Furthermore, in the above-mentioned embodiment, in Step S2, the vendor command parameters refer to identification information of the route where the downstream device 1 corresponding to the first available playing commands is located. Users may get to know the route to which the downstream device 1 switches with reference to the above-mentioned identification information.

Furthermore, in a preferred embodiment, in Step S3, the preset timer time period is in a range from 3 s to 7 s. It should be noted that, the preset timer time period may be adjusted depending on the communication quality of the CEC network. In general, the preset timer time period is in a range from 3 s to 5 s. However, under certain circumstance (for example, the communication quality of the CEC network is poor), the preset timer time period may be up to 7 s.

Figure 3:
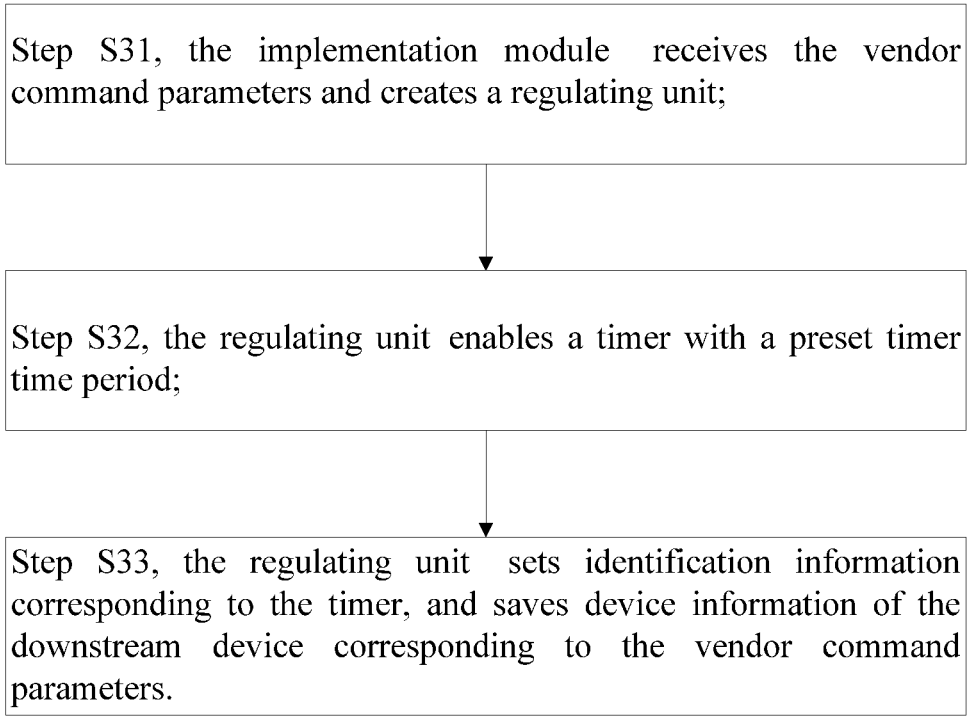
FIG. 3 is a flowchart showing Step S3 of a control method for improving network performance according to an embodiment of the present invention.

Furthermore, in the above-mentioned embodiment, as shown in FIG. 3, Step S3 further comprises the steps of:

Step S31, the implementation module 2 receives the vendor command parameters and creates a regulating unit;

Step S32, the regulating unit enables a timer with a preset timer time period;

Step S33, the regulating unit sets identification information corresponding to the timer, and saves device information of the downstream device 41 corresponding to the vendor command parameters.

In the above-mentioned embodiment, setting identification information corresponding to the timer makes it possible to indicate that the implementation module 2 is receiving the vendor command parameters.

Figure 4:
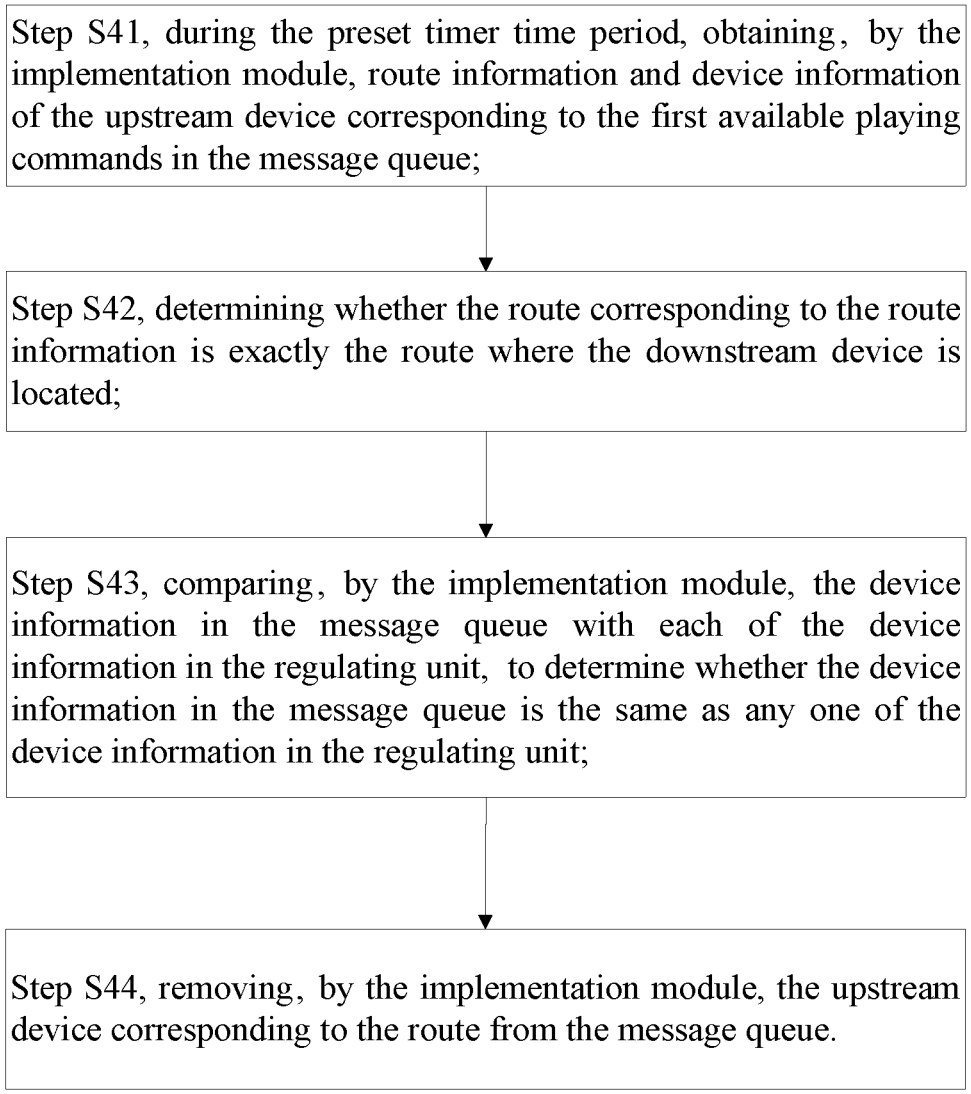
FIG. 4 is a flowchart showing Step S4 of a control method for improving network performance according to an embodiment of the present invention.

Furthermore, in the above-mentioned embodiment, as shown in FIG. 4, Step S4 comprises the steps of:

Step S41, during the preset timer time period, obtaining, by the implementation module 2, route information and device information of the upstream device corresponding to the first available playing commands in the message queue;

Step S42, determining whether the route corresponding to the route information is exactly the route where the downstream device 1 is located;

if yes, turning to Step S43;

if no, turning to Step S44;

Step S43, comparing, by the implementation module, the device information in the message queue with each of the device information in the regulating unit, to determine whether the device information in the message queue is the same as any one of the device information in the regulating unit;

if yes, the implementation module 2 removes the upstream device from the message queue, and exits;

if no, the implementation module 2 saves the upstream device in the message queue, and records the first available playing commands corresponding to the upstream device in the message queue as the second available playing commands;

For example, during the preset timer time period, when receiving a command "report physical address" in the CEC network commands of the current route, that is <Report Physical Address>, the implementation module 2 queries the device list of the CEC regulating unit, if the device does exit, the upstream device is filtered out, that is, the upstream device is removed from the message queue, so that the network congestion due to message exchange resulting from the addition of new devices may be avoided, and the network congestion is reduced to a certain extent;

Step S44, removing, by the implementation module, the upstream device corresponding to the route from the message queue.

For example, during the preset timer time period, when receiving a command "active the source of the upstream device" in the CEC network commands of the non-current route, that is <Active Source>, the implementation module 2 filters out the upstream device corresponding to the non-current route, that is, the upstream device corresponding to the non-current route is removed from the message queue, and sends a command "set route path" in the CEC network commands of the current route, that is <Set Stream Path>: re-setting the upstream device in the CEC network in which the downstream device 1 is switched to a corresponding route, and making the upstream device convert into an active upstream device, such that the network congestion is reduced.

For example, during the preset timer time period, when receiving a command "route information" in the CEC network commands of the non-current route, that is <Routing Information>, the implementation module 2 filters out the upstream device corresponding to the non-current route, that is, the upstream device corresponding to the non-current route is removed from the message queue, and sends a command "route change" in the CEC network commands of the current route, that is <Routing Change>, making the upstream device in the CEC network convert into an active upstream device, such that the network congestion is reduced.

Furthermore, in the above-mentioned embodiment, in prior to Step S5, the control method further comprises: determining whether the first available playing commands are periodic commands during the preset timer time period;

if yes, the implementation module 2 suppresses and delays the sending of the playing commands by the upstream device;

if no, continue to perform Step S4.

For example, during the preset timer time period, when receiving periodic playing commands, the implementation module 2 suppresses and delays the sending of the playing commands by the upstream device, and increases the frequency of <Polling> command in the CEC network commands of the current route, which is sent by the downstream device 1. Wherein, when two upstream devices compete for the bus, according to the CEC arbitration mechanism, one upstream device having the lower logical address gets the bus first, and the other upstream device having the higher logical address is forced to delay transmission. For example, the physical address of the sink device TV is 0, and the sink device has the highest priority.

In conclusion, when the CEC network creates a new route, a series of messages are exchanged, leading to an obvious network congestion and a transmission delay. By performing multiple filterings to the playing commands corresponding to each of the upstream devices, the number of messages in the CEC network is greatly reduced, and the network communication quality and performance is improved.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A control method for improving network performance, applied to a network of High Definition Multimedia Interface-Consumer Electronics Control (HDMI-CEC), wherein the network of the HDMI-CEC accesses at least one upstream device and a downstream device, and each of the upstream devices is communicatively connected with each of the downstream device through an implementation module;

wherein the control method comprises the steps of:

Step S1, each of the upstream devices issues corresponding playing commands; perform filtering to the playing commands to obtain first available playing commands;

Step S2, the downstream device receives the first available playing commands, switches to a route where the downstream device corresponding to the first available playing commands is located, and then issues vendor command parameters;

Step S3, the implementation module receives the vendor command parameters, then enables a timer with a preset timer time period, and sets identification information corresponding to the timer;

Step S4, during the preset timer time period, the implementation module filters the first available playing commands of each of the upstream devices to obtain second available playing commands;

Step S5, when the preset timer time period ends, the implementation module turns off the timer and resets the identification information; the downstream device receives the second available playing commands and switches to a route where the downstream device corresponding to the second available playing commands is located; and controls the corresponding upstream device to operate based on the second available playing commands; and the implementation module is positioned above a hardware abstraction layer of the downstream device.

2. The control method for improving network performance of claim 1, wherein Step S1 comprises the steps of:

Step S11, selecting a respective route by each of the upstream devices;

Step S12, issuing corresponding playing commands by each of the upstream devices;

Step S13, creating a message queue by the implementation module, and the playing commands corresponding to the upstream devices being sequentially stored in the message queue at a preset interval;

Step S14, filtering the playing commands, by the implementation module, according to a preset condition, so as to obtain the first available playing commands.

3. The control method for improving network performance of claim 2, wherein in Step S13, the preset interval is in a range from 0.01 s to 0.1 s.

4. The control method for improving network performance of claim 2, wherein in Step S14, the preset condition is that a plurality of identical and continuous playing commands are recorded as one of the first available playing commands.

5. The control method for improving network performance of claim 1, wherein in Step S2, the vendor command parameters refer to identification information of the route where the downstream device corresponding to the first available playing commands is located.

6. The control method for improving network performance of claim 1, wherein in Step S3, the preset timer time period is in a range from 3 s to 7 s.

7. The control method for improving network performance of claim 1, wherein Step S3 comprises the steps of:

Step S31, the implementation module receives the vendor command parameters and creates a regulating unit;

Step S32, the regulating unit enables a timer with a preset timer time period;

Step S33, the regulating unit sets identification information corresponding to the timer, and saves device information of the downstream device corresponding to the vendor command parameters.

8. The control method for improving network performance of claim 7, wherein Step S4 comprises the steps of:

Step S41, during the preset timer time period, obtaining, by the implementation module, route information and device information of the upstream device corresponding to the first available playing commands in the message queue;

Step S42, determining whether the route corresponding to the route information is exactly the route where the downstream device is located;

if yes, turning to Step S43;

if no, turning to Step S44;

Step S43, comparing, by the implementation module, the device information in the message queue with each of the device information in the regulating unit, to determine whether the device information in the message queue is the same as any one of the device information in the regulating unit;

if yes, the implementation module removes the upstream device from the message queue, and exits;

if no, the implementation module saves the upstream device in the message queue, and records the first available playing commands corresponding to the upstream device in the message queue as the second available playing commands; and Step S44, removing, by the implementation module, the upstream device corresponding to the route from the message queue.

9. The control method for improving network performance of claim 1, wherein in prior to Step S5, the control method further comprises: determining whether the first available playing commands are periodic commands during the preset timer time period;

if yes, the implementation module suppresses and delays the sending of the playing commands by the upstream device;

if no, continue to perform Step S4.

* * * * *